United States Patent
Grbach

(10) Patent No.: US 11,806,845 B1
(45) Date of Patent: Nov. 7, 2023

(54) LUG NUT ENGAGING TOOL

(71) Applicant: Peter Grbach, Pittsburgh, PA (US)

(72) Inventor: Peter Grbach, Pittsburgh, PA (US)

(*) Notice: Subject to any disclaimer, the term of this patent is extended or adjusted under 35 U.S.C. 154(b) by 182 days.

(21) Appl. No.: 16/893,382

(22) Filed: Jun. 4, 2020

(51) Int. Cl.
  *B25B 23/00* (2006.01)
  *B25B 13/50* (2006.01)
  *B25B 13/46* (2006.01)
  *B25B 13/06* (2006.01)
  *B60B 29/00* (2006.01)
  *B25G 1/00* (2006.01)

(52) U.S. Cl.
  CPC .......... *B25B 23/0021* (2013.01); *B25B 13/065* (2013.01); *B25B 13/46* (2013.01); *B25B 13/50* (2013.01); *B25B 23/0035* (2013.01); *B25G 1/007* (2013.01); *B60B 29/007* (2013.01)

(58) Field of Classification Search
  CPC ... B23B 23/0021; B23B 23/0035; B23B 13/46; B23B 13/50; B23B 13/065; B25G 1/007; B60B 29/007; B60B 29/005; B60B 29/006
  USPC .......................................................... 81/462
  See application file for complete search history.

(56) References Cited

U.S. PATENT DOCUMENTS

| | | | | |
|---|---|---|---|---|
| 2,313,398 A * | 3/1943 | Ronning | ................. | B25B 19/00 173/48 |
| 3,097,550 A * | 7/1963 | Johnston | ............. | B60B 29/007 81/462 |
| 3,730,027 A * | 5/1973 | Rohn | .................. | B60B 29/007 81/462 |
| 3,832,917 A | 9/1974 | Feith | | |
| 4,625,600 A * | 12/1986 | Koren et al. | ......... | B60B 29/007 81/180.1 |
| 4,660,447 A * | 4/1987 | Rossi | .................. | B60B 29/007 81/462 |
| 5,020,398 A * | 6/1991 | Leu | ..................... | B60B 29/003 81/177.2 |
| 5,216,940 A | 6/1993 | Hedden | | |
| 5,568,757 A | 10/1996 | Lewis | | |
| 6,041,681 A * | 3/2000 | Griffin, Sr. | .......... | B60B 29/007 248/407 |
| 6,662,688 B1* | 12/2003 | Avery | ................. | B25B 13/005 7/100 |

(Continued)

FOREIGN PATENT DOCUMENTS

KR    19980017027 U    7/1998

*Primary Examiner* — Don M Anderson
*Assistant Examiner* — Jason Khalil Hawkins
(74) *Attorney, Agent, or Firm* — William F. Lang IV; LANG PATENT LAW LLC

(57) ABSTRACT

A lug not engaging tool in the form of a rod includes a first end for receiving a standard socket, and a second end for engaging a socket wrench or impact wrench. An intermediate portion has a hexagonal section for engaging an open end wrench or a closed end box wrench. The rod includes sections having differing diameters. In use, a jack or jack stand may be placed under a section having an appropriate diameter to ensure that the jack or jack stand supports the lug nut engaging tool in a position that is substantially perpendicular to the wheel as the tool is used to loosen or tighten a lug nut.

2 Claims, 8 Drawing Sheets

(56) References Cited

U.S. PATENT DOCUMENTS

| | | | | |
|---|---|---|---|---|
| 6,662,692 | B2* | 12/2003 | Anderson et al. | B60B 29/003 7/100 |
| 6,748,832 | B1* | 6/2004 | Maxwell | B60B 29/003 81/121.1 |
| 6,769,333 | B2* | 8/2004 | Keady | B60B 29/007 81/462 |
| 8,887,599 | B2 | 11/2014 | Evans | |
| 10,065,454 | B2* | 9/2018 | Coetzee et al. | B60B 29/005 |
| 2002/0178874 | A1 | 12/2002 | Lee | |
| 2003/0010161 | A1* | 1/2003 | Ready | B60B 29/007 81/462 |
| 2009/0013833 | A1 | 1/2009 | Salanda | |
| 2012/0060656 | A1 | 3/2012 | Chang | |
| 2014/0182423 | A1 | 7/2014 | Liu | |
| 2015/0068369 | A1* | 3/2015 | Taylor | B60B 29/007 81/462 |
| 2016/0046147 | A1* | 2/2016 | Coetzee et al. | B60B 29/007 29/426.5 |

\* cited by examiner

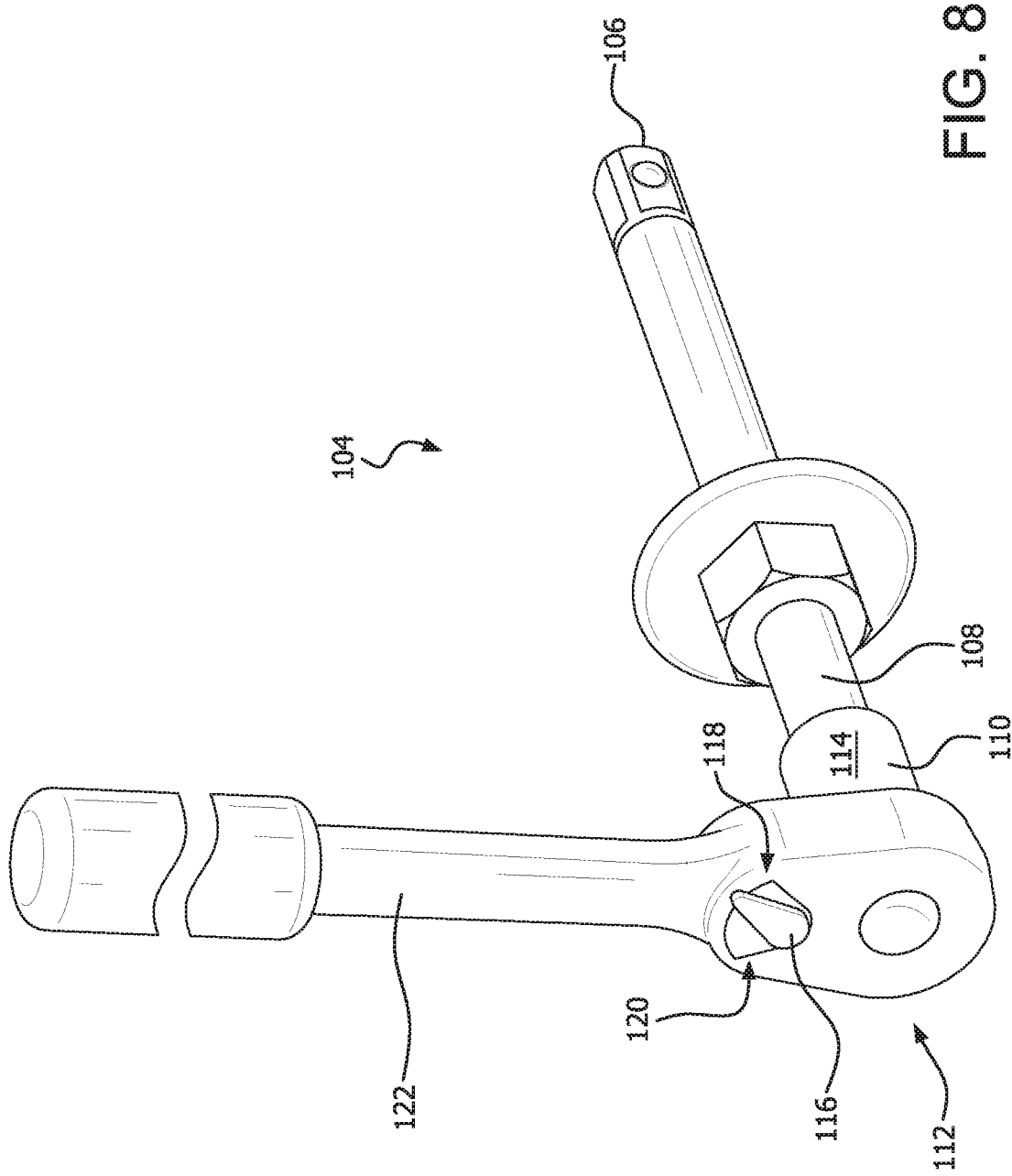

LUG NUT ENGAGING TOOL

TECHNICAL FIELD

The present invention relates to wrenches and wrench attachments. More specifically, a tool is provided for operatively joining with various types of wrenches for engaging a lug nut, while ensuring that the tool remains substantially perpendicular to the wheel which is fastened to a vehicle by the lug nut.

BACKGROUND INFORMATION

The need to change a tire is as old as air-filled tires. Despite this need, solutions that facilitate doing so under a variety of circumstances, including changing a flat tire with only the tools carried in a vehicle, have remained elusive. In particular, lug nuts that have been tightened using an impact wrench are difficult to loosen using the lug wrench provided with the spare tire of most vehicles. A motorist having a need to change a tire while stopped on the side of a road is unlikely to have anything available beyond the tools provided with the spare tire. Additionally, tires for large trucks often have lug nuts that are difficult to remove, which not only complicates changing a flat tire, but also increases the difficulty and cost of routine maintenance for these trucks.

An example of a previous solution Is shown within US 3,832,917, which discloses a device for loosening wheel nuts or lugs of automobile wheels. The device includes an upstanding rodlike member with a supporting base. The device has a collar slidable thereon which can be set at a selected height along the upstanding rodlike member by a thumb screw. A rod extends outwardly from the collar at a right angle. The rod engages the hollow bore of a straight socket wrench having a socket on the other end. The rod and socket wrench can be set to the height equal to the level of a nut or a lug on the automobile wheel to be loosened A spanner wrench is placed around the narrow socket end of the socket wrench for turning the socket wrench. The need for a specific stand in order to use this device reduces the usefulness of the device if the specific stand is unavailable.

US 5,216,940 discloses an extension apparatus for an open ended wrench. The extension device includes an intermediate portion, first and second collars, and first and second outer portions. The intermediate portion includes at least a pair of opposed parallel space sides to engage the open end of a wrench. The first outer portion includes a hollow aperture that is shaped to receive the drive member of a wrench. The second outer portion includes at least a pair of parallel, spaced apart outer side walls dimensioned to receive the drive member of a wrench. A first wrench extends between the nut to be turned and the intermediate portion of the extension device. A second wrench is coupled to one of the end portions of the extension device, and is used to turn the first wrench using the additional leverage of the second wrench.

US 5,568,757 discloses a socket wrench adapter. The adapter includes a square end for inserting into a socket, and an opposing hexagonal end having a square bore therein for receiving a socket wrench. If a socket wrench, Allen wrench, drill crank, or other cranking device is unavailable, then a wrench may be used in connection with the hexagonal end.

US 8,887,599 discloses a socket extension. The socket extension includes a first end with an attachment protuberance having a square shape and a spring loaded ball lock for attaching a socket. The second end may include a square attachment aperture for a socket wrench. The length of the extension is hexagonal so that it can be engaged with one or more wrenches anywhere along its length.

US 2002/0178874 discloses an intermediate member for connecting with tools. The intermediate member has a hexagonal cross section and a channel therethrough. The channel is divided into two portions by a flange with a hole defined therein. The first portion of the channel has a hexagonal cross section, and the second portion of the channel has a square cross section. The first hexagonal portion of the channel is longer than the second square portion. The second end can engage a ratchet wrench. The first section can engage a bit (which appears to be a screwdriver shaft). The hexagonal exterior surface can be grasped using a wrench.

US 2009/0013833 discloses a hex extension with a bolster. The extension has a first end portion is square and includes a detent. The second end includes a square bore for receiving a socket wrench, and a hexagonal perimeter. A lip is defined between the second end and the shaft. An abutment is defined between the lip and the second end for the attachment of a removable bolster. A second abutment for a second removable bolster may be located near the end of the second end. The wrench may rest on the lip, on the bolster, or between the bolsters to align the wrench with the hexagonal portion of the second end.

US 2012/0060656 discloses a dual drive hexagonal bit. The bit includes a drive end, an intermediate section, and a driven end. The driven end includes an internal square drive socket and a hexagonal outer surface. The drive end includes a square drive socket. First and second flanges separate the drive end from the driven end.

US 2014/0182423 discloses a wrench adapter. The adapter includes an elongated shaft, and adapter tip, and an adapter head. The shaft has an embossed pattern about the periphery near the adapter head. The adapter tip is configured to be inserted into a standard socket. The head includes a driven hole for receiving a tool bit. The adapter head includes two wrench driven portions, one having 6 faces around the outer surface of the head, and the other having four surfaces around the outer surface of the head. Another pair of opposing planes along the adapter shaft permit engaging a wrench.

KR 19980017027U discloses a bolt fastening tool. The tool includes an adapter having one end that can be coupled with a socket, another end that can be coupled with a socket wrench or twerk wrench, and a polygonal body that can be engaged by a wrench.

One of the most critical factors in loosening a lug nut is keeping the tool substantially parallel to the nut to be loosened, and thus substantially perpendicular to the wheel. As used herein, substantially parallel, substantially perpendicular, substantially equidistant, or substantially coaxial means sufficiently close to parallel or perpendicular to ensure that substantially all of the force applied to a lug nut through the tool is applied in a direction that tends to loosen the lug nut rather than to cause the tool to potentially slip off the lug nut. Those skilled in the art of physics will recognize that the amount of force effectively applied to an object is the magnitude of the force multiplied by the cosine of the angle at which the force is applied with respect to the desired direction of the force. Thus, the effective force diminishes as the angle increases. Additionally, every time a tool slips off the lug nut, there is a possibility of damaging the corners of the lug nut, making subsequent removal of the lug nut more difficult. Some users may attempt to place a pipe over the handle of a wrench (open end, box, or socket wrench) to increase the leverage for loosening a lug nut. While a longer lever obviously increases the force, that force is only useful to the extent that it is applied in a directing that is effective for loosening a lug nut rather than simply slipping off the lug nut.

Accordingly, there is a need for a tool that ensures that the tool used to remove a lug nut is held substantially perpendicular to the wheel. This will ensure that the force applied to a lug nut during removal is applied in a direction that is parallel to the direction in which the lug nut must be turned. There is a further need for a tool that can easily be stored within a vehicle, alongside the spare tire, jack, lug wrench, and other tools that are typically supplied with a vehicle. There is an additional need for a tool that can be supplied along with these other tools at minimal cost. The tool should be usable in combination with a variety of standard wrenches, impact wrenches, and other tools that are likely to be used for lug nut removal.

SUMMARY

The above needs are met by a lug nut engaging tool. The lug nut engaging tool comprises a shaft defining a plurality of shaft support sections. Each shaft support section defines a diameter, with the diameter of each shaft support section being different from the diameter of each other shaft support section. The tool further comprises a lug nut engaging end. The shaft further includes a turning interface.

The above needs are further met by a tire changing apparatus. The tire changing apparatus comprises a lug nut engaging tool. The lug nut engaging tool has a shaft defining a plurality of shaft support sections. Each shaft support section defines a diameter, with the diameter of each shaft support section being different from the diameter of each other shaft support section. The tool includes a lug nut engaging end. The shaft of the tool further includes a turning interface. The tire changing apparatus further comprises a support having a base, a platform, and a height adjustment mechanism for the platform, whereby the platform is placed at a predetermined platform height to support one of the shaft support sections to that the central longitudinal axis of the lug nut engaging tool is supported a distance from the ground, and each shaft support section corresponds to a different distance from the ground than the other shaft support sections when each shaft support section is supported by the platform at the predetermined platform height.

The above needs are also met by a method of loosening a lug nut for a tire. The method comprises providing a tire changing apparatus. The tire changing apparatus includes a lug nut engaging tool. The lug nut engaging tool has a shaft defining a plurality of shaft support sections. Each shaft support section defines a diameter, with the diameter of each shaft support section being different from the diameter of each other shaft support section. The tool also has a lug nut engaging end. The shaft of the tool has a turning interface. The tire changing apparatus further includes a support having a base, a platform, and a height adjustment mechanism for the platform. The method further comprises aligning the lug nut engaging tool with a lug nut of a tire so that the lug nut engaging tool is substantially perpendicular to the tire. The support is positioned underneath the lug nut engaging tool. The platform is raised until the platform engages one of the shaft support sections and the support holds the lug nut engaging tool substantially perpendicular to the wheel. The lug nut engaging tool is turned using the turning interface.

These and other aspects of the invention will become more apparent through the following description and drawings.

BRIEF DESCRIPTION OF THE DRAWINGS

FIG. 8 is a rear perspective view of a further example of the lug nut tool.

Like reference characters denote like elements throughout the drawings.

DETAILED DESCRIPTION

Figure 1:
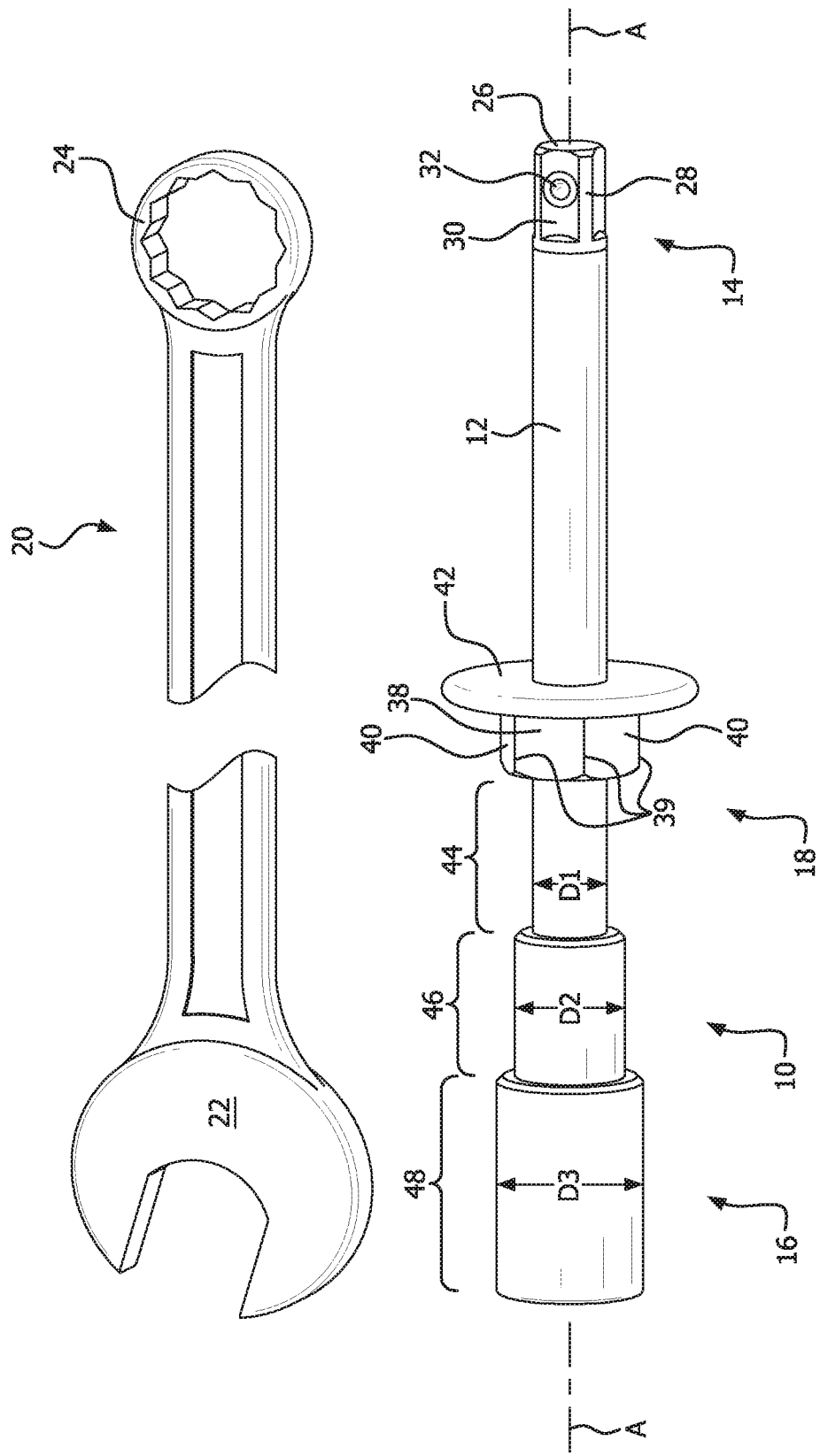
FIG. 1 is a side perspective view of an example of a lug nut tool along with an example of a wrench with which the lug nut tool may be used.
Figure 2:
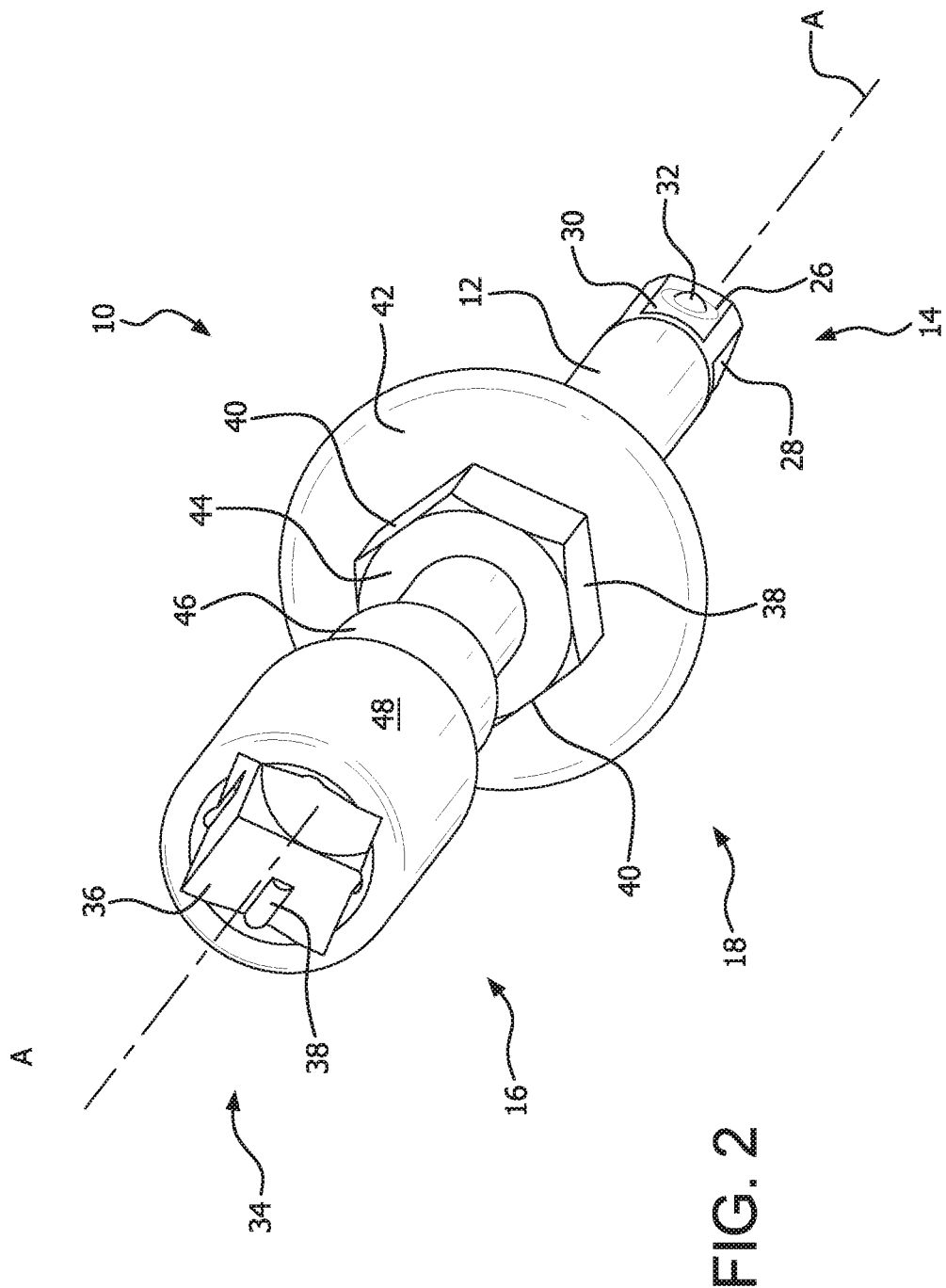
FIG. 2 is a rear perspective view of the lug nut tool of FIG. 1.

Referring to the drawings, there is shown a tool 10 for engaging a lug nut of a tire. Referring to FIGS. 1-2, the tool 10 includes a rod 12 having a first end 14, a second end 16, and an intermediate portion 18 therebetween. The illustrated example of the tool 10 is shown in connection with a standard wrench 20 having an open end 22 and the box end 24.

The first end 14 of the tool 10 includes a square tip 26 having three substantially identical sides 28, and a fourth side 30 having a ball detent 32 secured therein. Those skilled in the art of socket wrenches will recognize that the ball detent 32 is biased outwardly to retain a standard socket on the square tip 26, and can be moved inward against the bias for installation and removal of the socket. The square tip 26 is substantially coaxial with the longitudinal axis A of the shaft 12. As described in greater detail below, other examples of the tool 10 may include a first end 14 in the form of a specific socket for a specific size lug nut without departing from the invention. As used herein, a lug nut engaging end is defined as an end having either a square tip 26 for attaching a socket as described and illustrated, or having a permanently attached socket.

The second end 16 includes a generally square recess 34 defined therein, with the recess 34 also being substantially coaxial with the longitudinal axis A of the shaft 12. The recess 34 includes four sides 36, each of which defines a centrally located curved channel 38, extending in the same direction as the longitudinal axis A of the shaft 12. Those skilled in the art of sockets will recognize that the square recess 34 will receive the square tip of a socket wrench or impact wrench, and that each of the channels 38 will accommodate the ball detent that is typically present on a standard socket wrench.

The intermediate portion 18 includes a wrench engaging section 38 having at least one pair of parallel, opposed sides 40, each of which is substantially equidistant from the central axis A of the shaft 12. In the illustrated example, the wrench engaging section 38 is hexagonal, although in examples intended for use with open-ended wrenches, other shapes having parallel, opposed sides, such as square or octagonal, could be used without departing from the invention. As another option, the wrench engaging section 38 could have a plurality of outwardly protruding corners such as the corners 39. If the tool 10 is used in connection with a box wrench, the parallel, opposed sides are unnecessary, and it is the corners 39 that engage the inside of the box wrench to facilitate turning the tool 10. Examples having both parallel opposing sides and protruding corners may of course be used with either open ended or box wrenches. The illustrated example of the intermediate portion 18 also includes a flange 42 which serves as a stop against which a wrench can be rested while the wrench is being used to engage the wrench engaging section 38.

The shaft 12 includes three shaft support sections 44, 46, 48, each of which has a different diameter. In the illustrated example, section 44 includes the smallest diameter D1, section 46 includes an intermediate diameter D2, and section 48 includes the largest diameter D3. Each of the diameters D1, D2, and D3 are substantially uniform throughout each section 44, 46, 48. In the illustrated example, the shaft support sections 44, 46, 48 are located between the wrench engaging portion 38 and second end 16. Each of the shaft support sections 44, 46, 48 is substantially coaxial with the central axis A of the shaft 12. Each of the shaft support sections also defines an exterior surface which is substantially parallel to the axis A. As explained in greater detail below, any of the differing diameter sections 44, 46, 48 may be used to support the tool 10 on the top of a jack or a jack stand. Because each of the sections 44, 46, 48 has a different diameter, if a jack stand having discrete height settings is used, the section 44, 46, or 48 which places the tool 10 in the position closest to perpendicular to the wheel may be placed on top of the jack stand. Although three sections 44, 46, 48 are illustrated herein, as few as two sections having differing diameters, or more than three sections may be used without departing from the invention.

Figure 3:
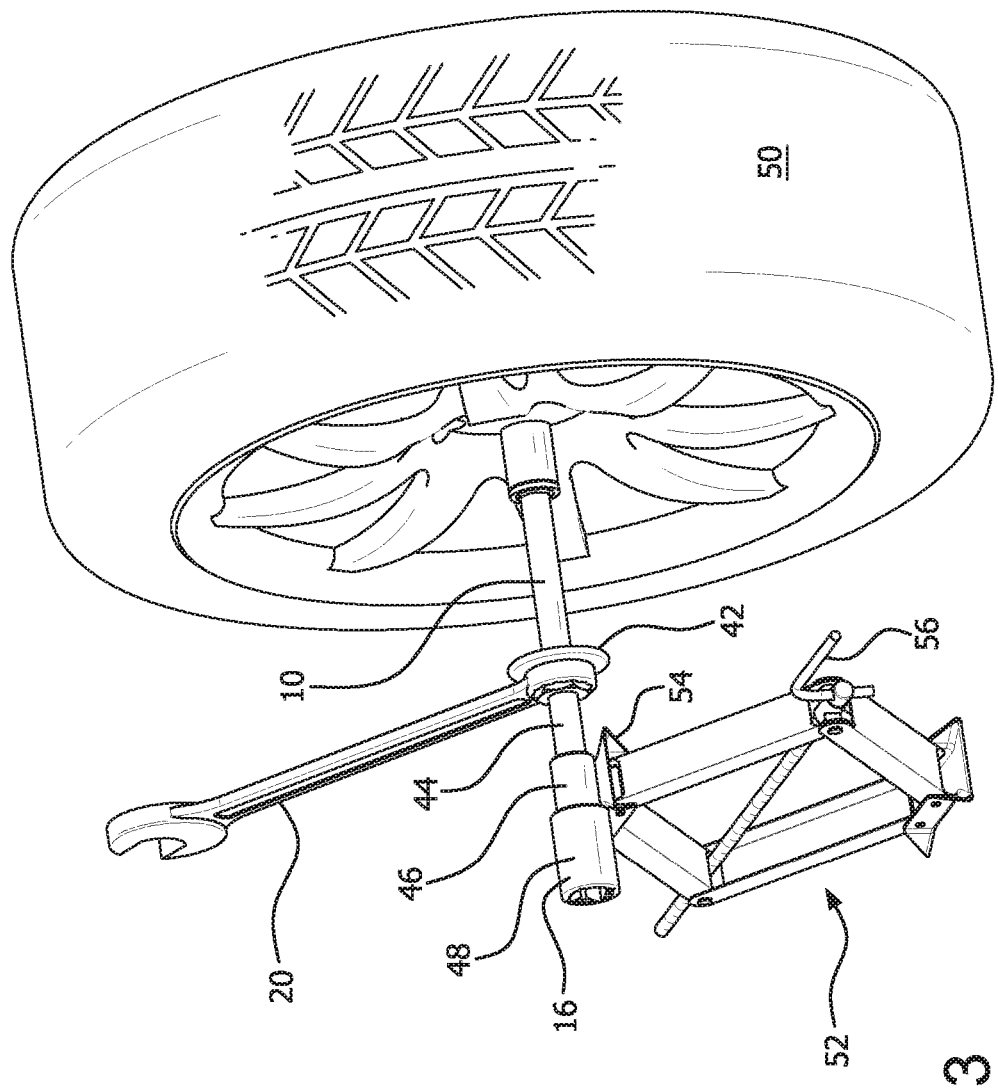
FIG. 3 is an environmental, perspective view of a lug nut tool being used in connection with a closed end wrench and a jack to loosen a lug nut.

Referring to FIG. 3, an example of the use of the tool 10 to loosen a lug nut for a wheel 50 is illustrated. A socket 51 has been attached to the square tip 26. In this example, the box end 24 of the wrench 20 has been slid over the end 16 of the tool 10 until it engages the wrench engaging portion 38, and abuts the flange 42. A jack 52, which in the illustrated example is a scissor jack of the type commonly provided with the spare tire of a vehicle, is supporting the tool 10, with the platform 54 under the section 46 in the illustrated example. Because the jack 52 is universally adjustable within its range of adjustment, the platform 54 could be placed under any of the sections 44, 46, 48. The crank 56 has been adjusted to bring the tool 10 into a position that is substantially perpendicular to the wheel 50. The wrench 20 can then be turned to loosen the lug nut while the tool 10 is held in place by the jack 50. Once all of the lug nuts have been loosened, the jack 52 can then be used to raise the vehicle, permitting removal and replacement of the wheel. Once the wheel is reinstalled, or a spare tire or different wheel installed, the jack 52 can then be set to the appropriate height so that the tool 10 can be used to fully tighten each of the lug nuts.

Figure 4:
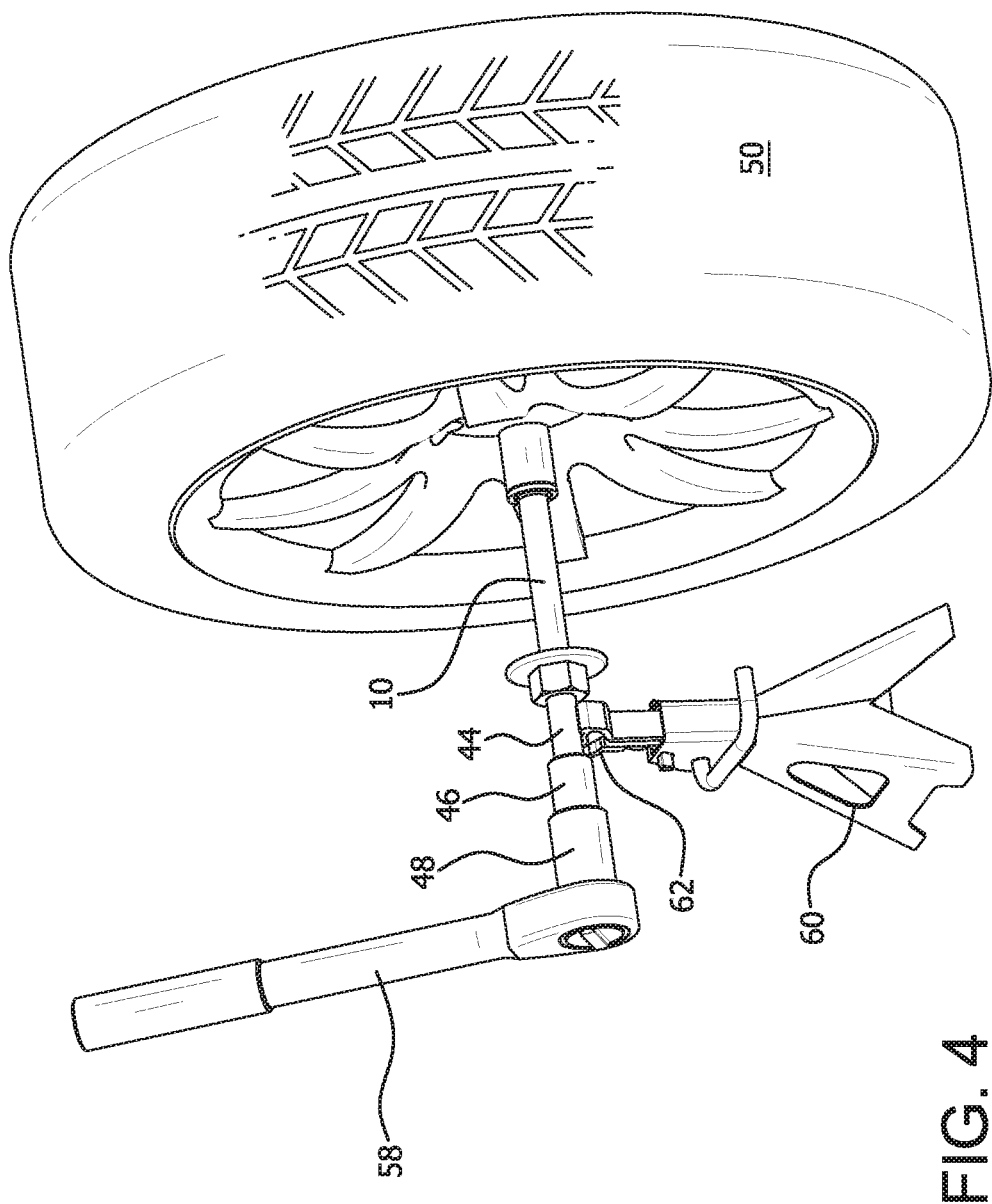
FIG. 4 is an environmental, perspective view of a lug nut tool being used in connection with a socket wrench and a jack stand to loosen a lug nut.

Referring to FIG. 4, another example of the use of the tool 10 to loosen a lug nut for a wheel 50 is illustrated. A socket 51 has been attached to the square tip 26. In this example, a socket wrench 58 has been brought into engagement with the recess 34 of the tool 10. A jack stand 60 is being used to support the tool 10, with the platform 62 of the jack stand 60 supporting the section 44 of the tool 10. Because the jack stand 60 is not universally adjustable, but instead includes discrete adjustment positions, it may be necessary to position the platform 62 under different sections 44, 46, 48 in order to position a tool 10 so that it is substantially parallel with each of the lug nuts on the wheel 50. Once each of the lug nuts has been loosened, the vehicle can then be raised using a jack, hydraulic lift, or in any other conventional manner for removal and replacement of the wheel 50. Once the wheel 50 is reinstalled, or a different wheel has been installed, the vehicle can be lowered, and the jack stand 60 can again be used to position the tool 10 so that it is substantially parallel to each of the lug nuts as each of the lug nuts is properly tightened.

Figure 5:
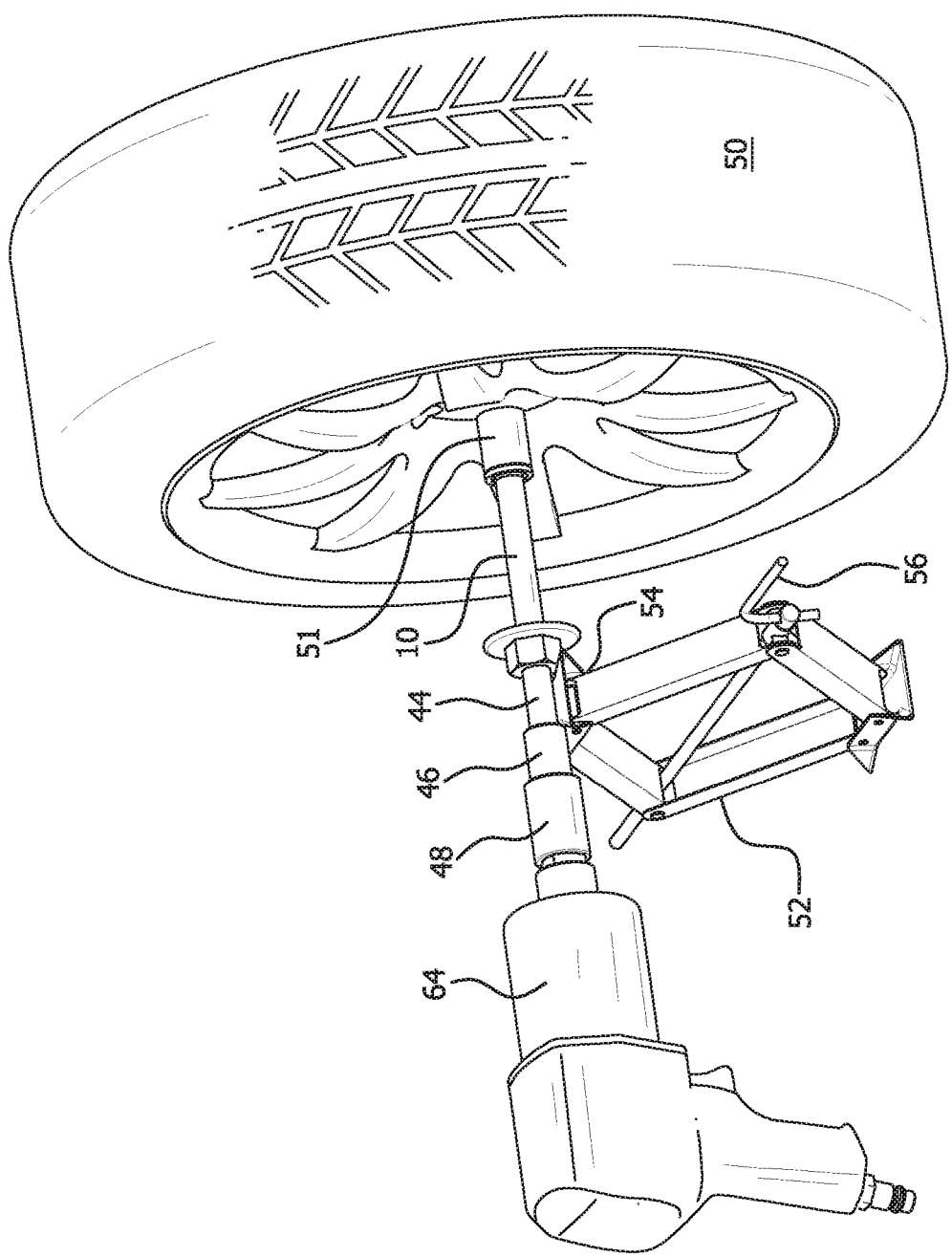
FIG. 5 an environmental, perspective view of a lug nut tool being used in connection with an impact wrench and a jack to loosen a lug nut.

Referring to FIG. 5, yet another example of the use of the tool 10 to loosen a lug nut for a wheel 50 is illustrated. A socket 51 has been attached to the square tip 26. In this example, an impact wrench 64 has been brought into engagement with the recess 34 of the tool 10. A jack 52 is being used to support the tool 10 in a position that is substantially perpendicular to the lug nut being loosened. In the illustrated example, the platform 54 of the jack 52 is shown supporting the section 44 of the tool 10. Once each of the lug nuts has been loosened, the vehicle can then be raised using a jack, hydraulic lift, or in any other conventional manner for removal and replacement of the wheel 50. Once the wheel 50 is reinstalled, or a different wheel has been installed, the vehicle can be lowered, and the jack 52 can again be used to position the tool 10 so that it is substantially parallel to each of the lug nuts as each of the lug nuts is properly tightened.

From the above description, it will be readily apparent to those skilled in the art of vehicle maintenance that any appropriately sized open ended wrench, box wrench, socket wrench, or impact wrench may be combined with any suitable jack, jack stand, or other support when using the tool 10 to loosen or tighten lug nuts. Additionally, some examples of the lug nut engaging tool may omit the wrench engaging portion 38 and flange 42, or alternatively may omit the recess 34. It is not necessary for every example of the lug nut engaging tool to engage every type of wrench. It is only necessary for at least one type of wrench or other turning mechanism to be provided on or engageable by the lug nut engaging tool.

Figure 6:
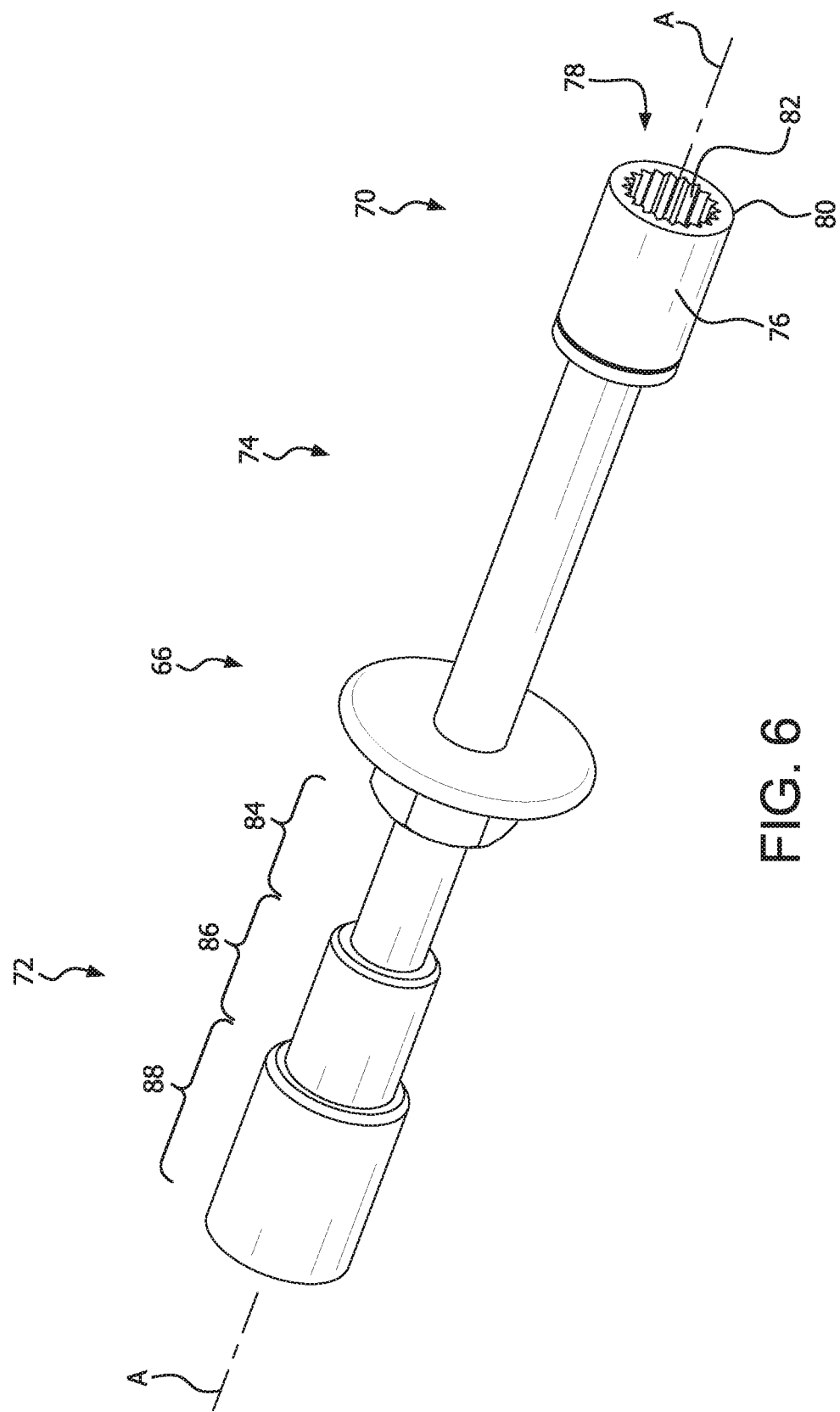
FIG. 6 is a side perspective view of another example of a lug nut tool.

Referring to FIG. 6, another variation of the tool 66. The tool 66 includes a rod 68 having a first end 70, a second end 72, and an intermediate portion 74 therebetween. The first end 70 of the tool 66 includes a permanently attached socket 76 having a recess 78 defined within its end surface 80, with a plurality of evenly spaced teeth 82 around the periphery of the recess 78. The recess is substantially coaxial with the longitudinal axis of the shaft 12. Those skilled in the art will recognize that the teeth 82 may engage the corners of a comparably sized lug nut. The second end 72 and intermediate portion 74 in the illustrated example are identical to the second end 16 and intermediate portion 18 of the tool 10 described above. In particular, three shaft sections 84, 86, 88 of differing diameter are identical to the sections 44, 46, 48 described above.

Figure 7:
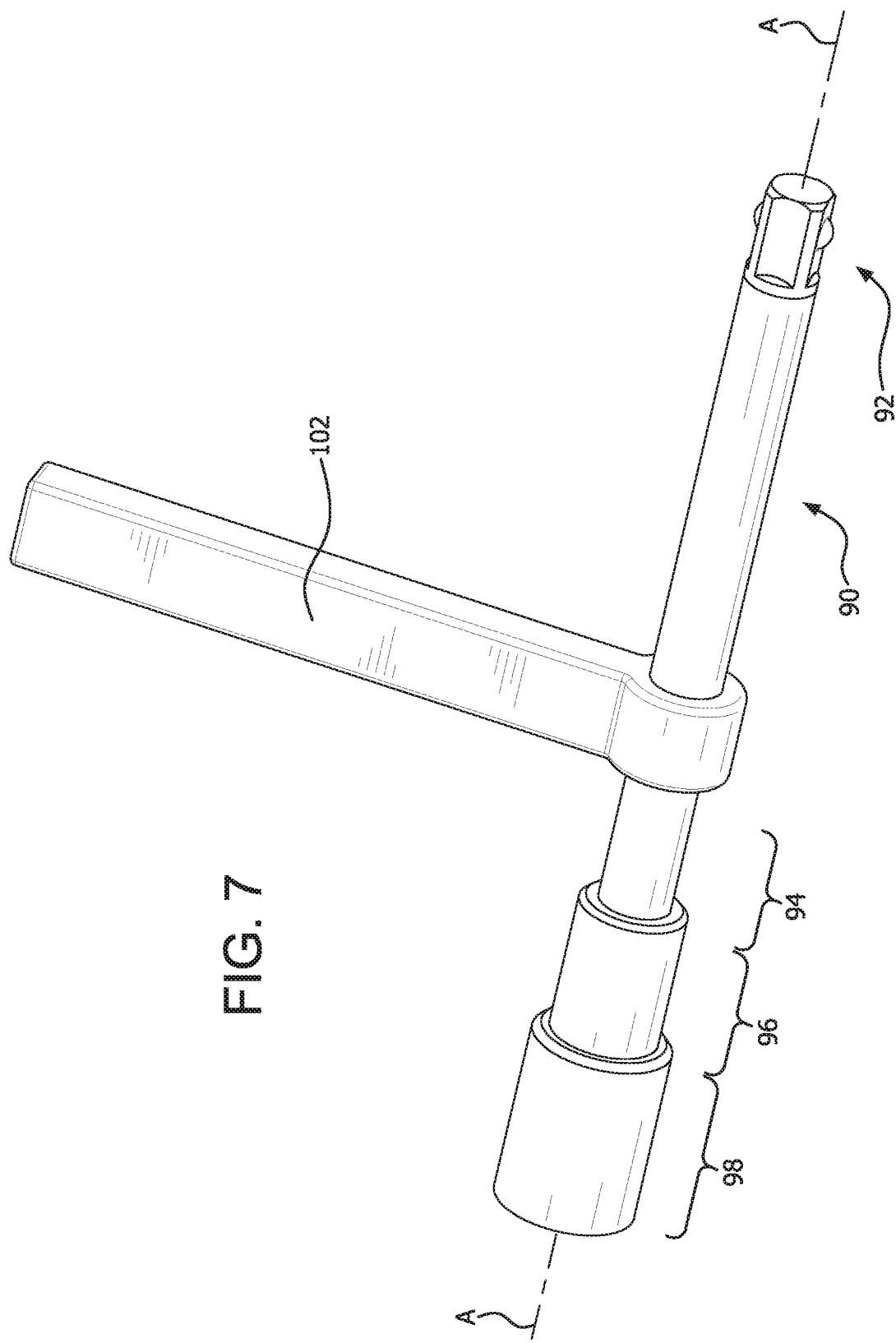
FIG. 7 is a side perspective view of yet another example of a lug nut tool.

Referring to FIG. 7, another example of the tool 90 is illustrated. The tool 90 includes a first end 92 that is identical to the first end 14 of the tool 10. The tool 90 also includes differing diameter shaft sections 94, 96, 98 that are identical to the sections 44, 46, 48 of the tool 10. A second end 100 may optionally include a recess that is identical to the recess 34 of the tool 10. Instead of a wrench engaging portion 34, the tool 90 includes a permanently attached lever 102.

FIG. 8 illustrates yet another example of the tool 104. The tool 104 includes a first end 106 that is identical to the first end 14 of the tool 10. The tool 104 also includes differing diameter shaft sections 108, 110 which are identical to the shaft sections 44, 46 of the tool 10. A second end 112 includes a ratchet assembly 114 which houses a conventional ratchet mechanism that is essentially the same as the ratchet mechanism of a standard ratchet wrench. A lever 116 may be moved to a first position 118 for tightening a lug nut, and a second position 120 for loosening a lug nut. A handle 122 extends from the ratchet assembly 114.

As the above examples of the tool illustrate, a wide variety of turning interfaces may be used to turn the tool to loosen a lug nut, including structures for interfacing with standard wrenches of various types, as well as arms or levers that are permanently attached to the tool. As used herein, turning interface shall mean a wrench engaging portion having at least two opposing substantially parallel sides, a recess for engaging a socket wrench, or an arm or lever which can be used to turn the tool, regardless of whether the lever is permanently attached, removable, or includes a ratchet mechanism. A user may also choose to place a length of pipe over the handle of any wrench (box, open end, or socket) used to turn the tool, or over any lever or arm that is permanently attached to the tool, in order to increase the effective length of the lever used to loosen the lug nut. Because the tool is supported substantially perpendicular to the wheel, the resulting increased force will not tend to change the angle of the tool or cause the tool to slip off the lug nut, and the increased force will be substantially entirely directed towards loosening the lug nut.

The present invention therefore provides a lug nut engaging tool that may be used in connection with a variety of standard human powered or impact wrenches to loosen a lug nut, or alternatively may be provided with a permanently attached lever. The lug nut engaging tool may be supported by a jack, jack stand, or other suitable support in order to be held substantially parallel to a lot nut that is being loosened. The tool is sufficiently compact and inexpensive to be provided with the spare tire and other tools typically supplied with the purchase of a vehicle. The tool is sufficiently effective to be useful by professional mechanics in vehicle service centers or fleet service centers for transportation businesses. The provision of different sections having different diameters ensures that a support that is not universally adjustable can be placed under an appropriate diameter section to maintain the tool substantially parallel to the lug nut being loosened, and/or substantially perpendicular to the wheel.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A unitary lug nut engaging tool, comprising:
   a completely rigid, shaft defining a central longitudinal axis, a lug nut engaging end, a second end opposite the lug nut engaging end, and a solid central portion;
   the shaft further defining at least three shaft support sections between the central portion and the second end, each shaft support section defining a diameter, the diameter of each shaft support section being different from the diameter of each other shaft support section, each shaft support section having a fixed position along the shaft, each shaft support section being coaxial with the central longitudinal axis;
   the shaft further having a turning interface, the turning interface being defined on the central portion of the shaft; and
   further comprising a flange disposed on the central portion of the shaft, the flange abutting and extending outward from the turning interface, the flange being disposed between the turning interface and the lug nut engaging end.

2. A tire changing apparatus, comprising:
   a unitary lug nut engaging tool, comprising:
      a completely rigid shaft defining a central longitudinal axis, a lug nut engaging end, a second end opposite the lug nut engaging end, and a solid central portion;
      the shaft further defining at least three shaft support sections between the central portion and the second end, each shaft support section defining a diameter, the diameter of each shaft support section being different from the diameter of each other shaft support section, each shaft support section having a fixed position along the shaft, each shaft support section being coaxial with the central longitudinal axis;
      the shaft further having a turning interface, the turning interface is being defined on the central portion of the shaft; and
      a flange disposed on the central portion of the shaft, the flange abutting and extending outward from the turning interface, the flange being disposed between the turning interface and the lug nut engaging end; and
   a support having a base, a platform, and a height adjustment mechanism for the platform;
      whereby the platform is placed at a predetermined platform height to support one of the shaft support sections to that the central longitudinal axis of the lug nut engaging tool is supported a distance from the ground, and each shaft support section corresponds to a different distance from the ground than the other shaft support sections when each shaft support section is supported by the platform at the predetermined platform height.

* * * * *